United States Patent
Horiuchi (10) Patent No.: US 10,381,133 B2
(45) Date of Patent: Aug. 13, 2019

(54) HEAT-RESISTANT FLEXIBLE ELECTRIC CABLE AND WIRE HARNESS USING THE SAME

(71) Applicant: Yazaki Corporation, Tokyo (JP)

(72) Inventor: Yuki Horiuchi, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/943,021

(22) Filed: Apr. 2, 2018

(65) Prior Publication Data

US 2018/0286537 A1    Oct. 4, 2018

Related U.S. Application Data

(63) Continuation of application No. PCT/JP2016/082130, filed on Oct. 28, 2016.

(30) Foreign Application Priority Data

Oct. 30, 2015    (JP) .................................. 2015-213996
Sep. 20, 2016    (JP) .................................. 2016-182805

(51) Int. Cl.
     *H01B 7/00*          (2006.01)
     *H01B 7/295*        (2006.01)
     (Continued)

(52) U.S. Cl.
     CPC .............. *H01B 7/295* (2013.01); *C08L 23/20* (2013.01); *C08L 101/00* (2013.01); *H01B 3/28* (2013.01);
     (Continued)

(58) Field of Classification Search
     CPC . H01B 3/02; H01B 3/30; H01B 7/295; H01B 7/02
     (Continued)

(56) References Cited

U.S. PATENT DOCUMENTS 5,306,869 A   *   4/1994   Springer .............. H01B 7/0861
                                                       156/53
9,175,159 B2 *   11/2015   Furuta .................... C08K 5/098
     (Continued)

FOREIGN PATENT DOCUMENTS

CN           103123816 A      5/2013
JP            H08-337724 A     12/1996
     (Continued)

OTHER PUBLICATIONS

International Search report of PCT/JP2016/082130 filed Dec. 27, 2016.

(Continued)

*Primary Examiner* — William H. Mayo, III
(74) *Attorney, Agent, or Firm* — Sughrue Mion, PLLC (57) ABSTRACT

A heat-resistant flexible electric cable (1) includes a coating layer (3) having a phase-separated structure including a continuous phase (11) formed with a non-crosslink structured resin having a melting point of 200° C. or more, and a dispersed phase (12) formed with a thermoplastic elastomer having a melting point of 200° C. or less. Further, the heat-resistant flexible electric cable includes an electric conductor 2 coated with the above-mentioned coating layer. Further, an average aspect ratio of the dispersed phase is 10 or less. Further, a wire harness includes the heat-resistant flexible electric cable.

10 Claims, 2 Drawing Sheets

(51) Int. Cl.
    *C08L 23/20*     (2006.01)
    *C08L 101/00*     (2006.01)
    *H01B 3/28*     (2006.01)
    *H01B 7/02*     (2006.01)
    *H01B 3/30*     (2006.01)

(52) U.S. Cl.
    CPC .............. *H01B 3/30* (2013.01); *H01B 7/00* (2013.01); *H01B 7/0045* (2013.01); *H01B 7/02* (2013.01)

(58) Field of Classification Search
    USPC ............ 174/110 R, 110 AR, 120 R, 120 AR, 174/121 R, 121 AR
    See application file for complete search history.

(56) References Cited

U.S. PATENT DOCUMENTS

| | | | | |
|---|---|---|---|---|
| 2005/0197460 | A1* | 9/2005 | Patel | C08L 23/0846 |
| | | | | 525/192 |
| 2007/0037910 | A1* | 2/2007 | Murakami | C08K 3/22 |
| | | | | 524/323 |
| 2007/0048524 | A1 | 3/2007 | Hase | |
| 2008/0207832 | A1* | 8/2008 | Worley | C08L 53/02 |
| | | | | 525/89 |
| 2010/0043906 | A1* | 2/2010 | Jackson | B32B 15/08 |
| | | | | 138/149 |
| 2010/0234500 | A1* | 9/2010 | Hara | B60C 1/0008 |
| | | | | 524/169 |
| 2012/0065305 | A1* | 3/2012 | Kiura | C08L 27/18 |
| | | | | 524/101 |
| 2013/0130031 | A1 | 5/2013 | Yamazaki et al. | |
| 2014/0357775 | A1* | 12/2014 | Furuta | C08K 5/098 |
| | | | | 524/399 |

FOREIGN PATENT DOCUMENTS

| | | | | |
|---|---|---|---|---|
| JP | 2005-105040 A | 4/2005 | | |
| JP | 2005-162931 A | 6/2005 | | |
| JP | 2007-250245 A | 9/2007 | | |
| JP | 2009-301921 A | * 12/2009 | .............. H01B 7/34 |
| JP | 2014-136738 A | 7/2014 | | |

OTHER PUBLICATIONS

Communication dated Jan. 30, 2019 issued by the China National Intellectual Property Administration in counterpart application No. 201680057860.6.

* cited by examiner

HEAT-RESISTANT FLEXIBLE ELECTRIC CABLE AND WIRE HARNESS USING THE SAME

CROSS REFERENCE TO RELATED APPLICATION

This application is a Continuation of PCT Application No. PCT/JP2016/082130, filed on Oct. 28, 2016, and claims the priority of Japanese Patent Application Nos. 2015-213996, filed on Oct. 30, 2015, and 2016-182805, filed on Sep. 20, 2016, the content of all of which is incorporated herein by reference.

BACKGROUND

1. Technical Field

The present invention relates to a heat-resistant flexible electric cable and a wire harness using the heat-resistant flexible electric cable. Specifically, the present invention relates to a heat-resistant flexible electric cable having excellent flexibility in addition to high heat-resistance, and a wire harness using the above-mentioned heat-resistant flexible electric cable.

2. Related Art

A coating layer of an electric cable used in, for example, an engine compartment of a motor vehicle requires high-temperature melt resistance or the like to prevent melting even under a high-temperature condition. Conventionally, as a coating layer for an electric cable having high-temperature melt resistance, a thermoplastic resin such as a polymethylpentene resin having a melting point higher than that of polyolefin-based resin such as polyethylene and polypropylene has been proposed.

For example, Patent Literature 1 discloses a non-crosslinked flame-resistant resin composition containing a metal hydrate, a hindered phenolic antioxidant, a sulfur-based antioxidant, and a metal oxide in a non-crosslinked base resin including a propylene-based resin and a thermoplastic resin having a melting point of 180° C. or more. Further, Patent Literature 1 also discloses that the thermoplastic resin having a melting point of 180° C. or more is polymethylpentene.

Patent Literature 1: Japanese Unexamined Patent Application Publication No. 2005-162931 A

SUMMARY

However, a resin composition described in Patent Literature 1 has a problem that the resin composition has low flexibility when used as an electric cable since a large amount of metal hydrate is added to ensure flame-resistance, and flexibility of a propylene-based resin, which is a raw material, itself is low.

In addition, as a coating layer of an electric cable, a silicone resin or fluororesin may be also used. However, a silicone resin has a problem of having low anti-abrasive properties, whereas having a high flexibility, and fluororesin has a problem of having low flexibility, whereas having good heat-resistance, chemical resistance and mechanical properties or the like.

The present invention has been made in view of the problems of prior arts. Thus, an object of the present invention is to provide a heat-resistant flexible electric cable having an excellent heat-resistance and flexibility, and to provide a wire harness using the above-mentioned heat-resistant flexible electric cable.

A heat-resistant flexible electric cable according a first aspect of the present invention includes a coating layer having a phase-separated structure including a continuous phase formed with a non-crosslink structured resin having a melting point of 200° C. or more, and a dispersed phase formed with a thermoplastic elastomer having a melting point of less than 200° C. Further, the heat-resistant flexible electric cable includes an electric conductor coated with the above-mentioned coating layer. Further, an average aspect ratio of the dispersed phase is 10 or less.

A heat-resistant flexible electric cable according to a second aspect of the present invention relates to the heat-resistant flexible electric cable of the first aspect, wherein the non-crosslink structured resin is a polymethylpentene copolymer.

A heat-resistant flexible electric cable according to a third aspect of the present invention relates to the heat-resistant flexible electric cable of the first or the second aspect, wherein a mass ratio (A/B) between the non-crosslink structured resin (A) and the thermoplastic elastomer (B) is from 30/70 to 60/40.

A heat-resistant flexible electric cable according to a fourth aspect of the present invention relates to the heat-resistant flexible electric cable of any of the first to third aspects, wherein melt flow rate of the thermoplastic elastomer is 0.5 g/10 minutes or less.

A heat-resistant flexible electric cable according to a fifth aspect of the present invention relates to the heat-resistant flexible electric cable of any of the second to fourth aspects, wherein the above-mentioned coating layer contains a resin composition containing a polymethylpentene copolymer which is the above-mentioned non-crosslink structured resin, the above-mentioned thermoplastic elastomer, and a flame retardant, and having a bending modulus of 400 MPa or less.

A heat-resistant flexible electric cable according to a sixth aspect of the present invention relates to the heat-resistant flexible electric cable of the fifth aspect, including 8 to 30 parts by mass of the above-mentioned flame retardant relative to 100 parts by mass (in total) of the above-mentioned polymethylpentene copolymer in an amount of 30 to 60 parts by mass and the above-mentioned thermoplastic elastomer in an amount of 40 to 70 parts by mass.

A heat-resistant flexible electric cable according to a seventh aspect of the present invention relates to the heat-resistant flexible electric cable of the fifth or sixth aspect, wherein the above-mentioned flame retardant is a bromine-based flame retardant.

A heat-resistant flexible electric cable according to an eighth aspect of the present invention relates to the heat-resistant flexible electric cable of any of the first to seventh aspects, wherein the thermoplastic elastomer includes a crosslinked rubber component.

A heat-resistant flexible electric cable according to a ninth aspect of the present invention relates to the heat-resistant flexible electric cable of any of the second to eighth aspects, wherein a bending modulus of the polymethylpentene copolymer is 1400 MPa or less.

A heat-resistant flexible electric cable according to a tenth aspect of the present invention relates to the heat-resistant flexible electric cable of any of the first to ninth aspects, wherein durometer type A hardness of the thermoplastic elastomer is 50 or more.

A wire harness according to an eleventh aspect of the present invention includes the heat-resistant flexible electric cable of any of the first to tenth aspects.

A coating layer of a heat-resistant flexible electric cable of the present invention can achieve high heat-resistance and flexibility since the coating layer has a phase-separated structure including a continuous phase formed with a non-crosslink structured resin, and a dispersed phase formed with a thermoplastic elastomer, and an average aspect ratio of a dispersed phase is 10 or less.

DETAILED DESCRIPTION

A heat-resistant flexible electric cable according to an embodiment of the present invention, and a wire harness using the above-mentioned heat-resistant flexible electric cable are described below in detail with reference to the drawings. The dimension ratios of the drawings are exaggerated for the purpose of illustration, and thus the ratios are sometimes different from actual ratios.

Figure 1:
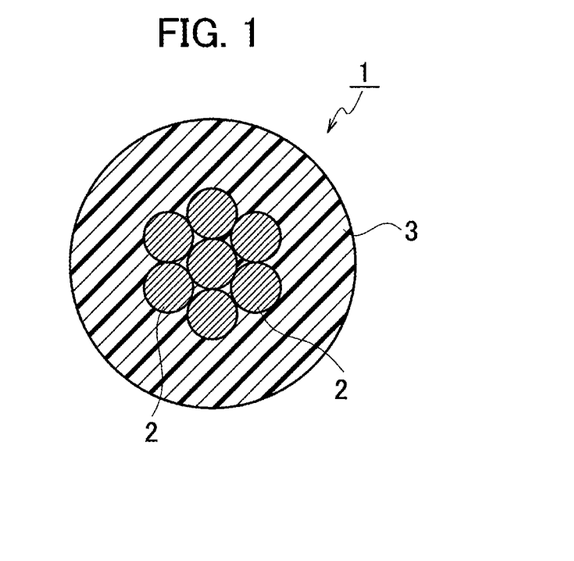
FIG. 1 is a cross-sectional view showing a heat-resistant flexible electric cable according to an embodiment of the present invention.

A heat-resistant flexible electric cable 1 according to the embodiment includes, as shown in FIG. 1, a coating layer 3 having electrical insulation properties, and an electric conductor 2 coated with the coating layer 3. Further, the coating layer 3 includes a resin composition containing a non-crosslink structured resin having a melting point of 200° C. or more, and a thermoplastic elastomer having a melting point of less than 200° C.

Since the resin composition of the coating layer 3 includes a non-crosslink structured resin having a melting point of 200° C. or more, heat-resistance, which provides capability for use under a high-temperature condition, for example, in an engine compartment of a motor vehicle, can be achieved. Then, a non-crosslink structured resin is a resin without treatment for forming an irreversible crosslinking bond between linear polymers. A non-crosslink structured resin having a melting point of 200° C. or more includes, for example, a polymethylpentene copolymer.

The resin composition of the coating layer 3 includes a thermoplastic elastomer having a melting point of less than 200° C. in addition to the above-described non-crosslink structured resin. Since the resin composition includes such a thermoplastic elastomer in conjunction with the above-described non-crosslink structured resin, flexibility owing to the thermoplastic elastomer can be provided in addition to heat-resistance owing to the non-crosslink structured resin. The melting points of a non-crosslink structured resin and a thermoplastic elastomer can be measured according to Japanese Industrial Standards JIS K7121 (Testing Methods for Transition Temperatures of Plastics).

Figure 2:
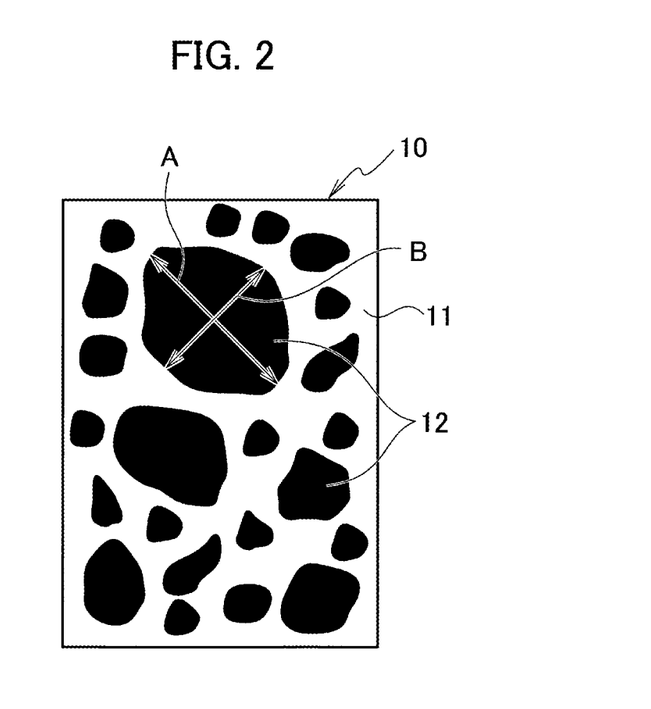
FIG. 2 is a schematic representation for illustrating a phase-separated structure in a coating layer of a heat-resistant flexible electric cable.

A resin composition 10 of the coating layer 3 has a phase-separated structure in which a non-crosslink structured resin and a thermoplastic elastomer are mixed as shown in FIG. 2. Further, the non-crosslink structured resin forms a continuous phase (a matrix phase) 11, and the thermoplastic elastomer forms a dispersed phase (domain phase) 12. That is, the resin composition 10 has a sea-island structure in which a low-volume dispersed phase 12 is dispersed in the continuous phase 11. Since the resin composition 10 has such a sea-island structure, heat-resistance is improved by the continuous phase 11 including the non-crosslink structured resin, and further, flexibility is improved by the dispersed phase 12 including the thermoplastic elastomer.

In the resin composition 10, an average aspect ratio of the dispersed phase 12 is preferably 10 or less. An aspect ratio refers to a ratio of a maximum value of distance between two points on an outline of the dispersed phase 12 (length A of a major axis) to length B of a minor axis perpendicular to the major axis ([length A of the major axis]/[length B of the minor axis]). When an average aspect ratio of the dispersed phase 12 is 10 or less, flexibility of the resin composition 10 can be improved. An average aspect ratio of a dispersed phase 12 can be obtained by observing the dispersed phase 12 by using a scanning electron microscope (SEM) or a transmission electron microscope (TEM).

In the resin composition 10, a mass ratio (A/B) between a non-crosslink structured resin (A) and a thermoplastic elastomer (B) is preferably from 30/70 to 60/40. When a content of a non-crosslink structured resin in 100 parts by mass (in total) of a non-crosslink structured resin and a thermoplastic elastomer is 30 parts by mass or more, a resin composition having good heat-resistance can be obtained. Further, when a content of the non-crosslink structured resin is 60 parts by mass or less, a resin composition having good flexibility can be obtained. Further, a content of the non-crosslink structured resin is more preferably from 35 parts by mass to 55 parts by mass. When a content of the non-crosslink structured resin is within the above-described range, a resin composition having better high-temperature melt resistance and flexibility can be obtained.

As described above, a non-crosslink structured resin having a melting point of 200° C. or more is preferably a polymethylpentene copolymer. Examples of a polymethylpentene copolymer used include a copolymer of methylpentene monomer and another alpha olefin. Further, the methylpentene monomer is preferably 4-methylpentene-1.

A bending modulus of a polymethylpentene copolymer is preferably 1400 MPa or less. More specifically, a bending modulus of a polymethylpentene copolymer is preferably from 300 MPa to 1400 MPa. When a polymethylpentene copolymer has a bending modulus of 300 MPa or more and 1400 MPa or less, a resin composition having good flexibility can be obtained, and thus can be used as a coating layer of an electric cable. A bending modulus of a polymethylpentene copolymer is more preferably 400 MPa or more and 800 MPa or less. When a bending modulus of a polymethylpentene copolymer is within the above-described range, a resin composition having better flexibility can be obtained. A bending modulus value can be obtained by preparing an injection molded piece of a resin composition having a thickness of 3.2 mm and carrying out a measurement according to ASTM-D790 using testing speed of 1.3 mm/min and at distance between fulcrums of 51 mm under atmosphere at 23° C.

A thermoplastic elastomer (TPE) of the embodiment is the same as that defined in JIS K6418 (THERMOPLASTIC ELASTOMERS—NOMENCLATURE AND ABBREVIATED TERMS). That is, a thermoplastic elastomer (TPE) includes a polymer or a polymer blend which can be molded or remolded at higher temperature similarly to a thermoplastic resin, whereas having properties similar to vulcanized rubber at operating temperature. Examples of a thermoplastic elastomer (TPE) used include an amide-based thermoplastic elastomer (TPA), an ester-based thermoplastic elastomer (TPC), an olefin-based thermoplastic elastomer (TPO), a styrene-based thermoplastic elastomer (TPS), a urethane-based thermoplastic elastomer(TPU), a dynamic crosslinked thermoplastic elastomer (TPV), and other thermoplastic elastomers (TPZ). Any one of the thermoplastic elastomers can be used alone, or two or more types of the thermoplastic elastomers can be mixed and then the resultant can be used.

Further, as a thermoplastic elastomer having a melting point of less than 200° C., it is preferred to use an olefin-based thermoplastic elastomer (TPO) or a dynamic crosslinked thermoplastic elastomer (TPV). When an olefin-based thermoplastic elastomer (TPO) or a dynamic crosslinked thermoplastic elastomer (TPV) is used, a resin composition having good flexibility and heat-resistance can be obtained. Further, as a thermoplastic elastomer, it is more preferred to use a dynamic crosslinked thermoplastic elastomer (TPV). When a dynamic crosslinked thermoplastic elastomer (TPV) is used, a resin composition having good oil resistance can be obtained.

Examples of an olefin-based thermoplastic elastomer (TPO) include a type of TPO which is a simple blend of polyolefin and rubber, and a type of TPO which is produced by adding a comonomer such as ethylene during polymerization of propylene and then blending in-situ. Further, a rubber phase of the blended material includes no crosslinking point or almost no crosslinking point.

Examples of the polyolefin used in an olefin-based thermoplastic elastomer (TPO) include a homopolymer of an alpha-olefin such as ethylene, propylene, 1-butene, 1-pentene, 1-hexene, 4-methyl-1-pentene, 1-octene, and 1-decene, or a copolymer of two or more alpha-olefins including ethylene, propylene, 1-butene, 1-pentene, 1-hexene, 4-methyl-1-pentene, 1-octene, and 1-decene. Specifically, for example, polypropylene-based resin or polyethylene-based resin can be used.

Examples of the rubber used in an olefin-based thermoplastic elastomer (TPO) include naturally occurring rubber (NR), isoprene rubber (IR), butadiene rubber (BR), a styrene-butadiene copolymer rubber (SBR), an acrylonitrile-butadiene copolymer rubber (NBR), chloroprene rubber (CR), butyl rubber (IIR), ethylene-propylene rubber (EPM), and ethylene-propylene-diene rubber (EPDM). Any one of the rubbers can be used alone, or two or more types of the rubbers can be mixed and then the resultant can be used. A particularly preferred rubber used in an olefin-based thermoplastic elastomer (TPO) is at least any one of ethylene-propylene rubber (EPM) and ethylene-propylene-diene rubber (EPDM).

A dynamic crosslinked thermoplastic elastomer (TPV) is a blended material of a thermoplastic resin and a general rubber, and the rubber has dynamic crosslinking which is formed during blending or kneading process. It is preferred to use a blended material of a thermoplastic resin and a crosslinked rubber as a thermoplastic elastomer of the embodiment since a resin composition having good oil resistance can be obtained, however, the rubber is not necessarily required to be crosslinked by dynamic vulcanization. That is, a thermoplastic elastomer of the embodiment preferably contains a crosslinked rubber component.

Examples of the thermoplastic resin used in a dynamic crosslinked thermoplastic elastomer (TPV) include an amide-based resin, an ester-based resin, an olefin-based resin, a styrene-based resin, and a urethane-based resin. Any one of the thermoplastic resins can be used alone, or two or more types of the thermoplastic resins can be mixed and the resultant can be used.

Examples of the rubber used in a dynamic crosslinked thermoplastic elastomer (TPV) include, but are not specifically limited to, naturally occurring rubber (NR), isoprene rubber (IR), butadiene rubber (BR), a styrene-butadiene copolymer rubber (SBR), an acrylonitrile-butadiene copolymer rubber (NBR), chloroprene rubber (CR), butyl rubber (IIR), ethylene-propylene rubber (EPM), and ethylene-propylene-diene rubber (EPDM). Any one of the rubbers can be used alone, or two or more types of the rubbers can be mixed and then the resultant can be used. A particularly preferred rubber used in a dynamic crosslinked thermoplastic elastomer (TPV) is at least any one of ethylene-propylene rubber (EPM) and ethylene-propylene-diene rubber (EPDM).

As described above, in the resin composition 10, a mass ratio (A/B) between a non-crosslink structured resin (A) and a thermoplastic elastomer (B) is preferably from 30/70 to 60/40. When a content of a non-crosslink structured resin is 30 parts by mass or more, a resin composition having good heat-resistance can be obtained. Further, when a content of a non-crosslink structured resin is 60 parts by mass or less, a resin composition having good flexibility can be obtained, and thus can be used as, for example, a coating layer of an electric cable. Further, a content of the non-crosslink structured resin is more preferably from 35 parts by mass to 55 parts by mass. When a content of the non-crosslink structured resin is within the above-described range, a resin composition having better heat-resistance and flexibility can be obtained. On the other hand, when a content of a thermoplastic elastomer in 100 parts by mass (in total) of a non-crosslink structured resin and a thermoplastic elastomer is 40 parts by mass or more, a resin composition having good flexibility can be obtained. Further when a content of a thermoplastic elastomer is 70 parts by mass or less, a resin composition having good heat-resistance can be obtained. Further, a content of a thermoplastic elastomer is more preferably from 45 parts by mass to 65 parts by mass. When a content of the thermoplastic elastomer is within the above-described range, a resin composition having better flexibility and heat-resistance can be obtained.

In a resin composition 10, melt flow rate of a thermoplastic elastomer is preferably 0.5 g/10 minutes or less. When melt flow rate is 0.5 g/10 minutes or less, an average aspect ratio of a dispersed phase tends to be 10 or less, and thus flexibility of the coating layer 3 can be improved. The melt flow rate can be obtained by a method for measurement defined in JIS K7210-1 (PLASTICS—DETERMINATION OF THE MELT MASS-FLOW RATE (MFR) AND MELT VOLUME-FLOW RATE (MVR) OF THERMOPLASTICS-PART 1: STANDARD METHOD). Further, conditions for measurement of melt flow rate are as follows: testing temperature of 250° C., and load of 2.16 kg.

In a resin composition 10, an instantaneous value of durometer type A hardness of a thermoplastic elastomer is preferably 50 or more. More specifically, an instantaneous value of durometer type A hardness of a thermoplastic elastomer is preferably 50 or more and 100 or less. When an instantaneous value of durometer type A hardness is 50 or more and 100 or less, anti-abrasive properties of a resin composition is further improved, and thus the resin composition can be preferably used in a coating layer 3. An instantaneous value of durometer type A hardness is more preferably 70 or more and 90 or less. When an instantaneous value of durometer type A hardness is within the above-described range, a resin composition having good flexibility can be obtained, and thus the resin composition can be preferably used in a coating layer 3. An instantaneous value of durometer type A hardness can be measured according to JIS K7215 (TESTING METHODS FOR DUROMETER HARDNESS OF PLASTICS).

A resin composition 10 composing the coating layer 3 preferably contains a flame retardant in addition to the above-described non-crosslink structured resin and thermoplastic elastomer. Examples of a flame retardant which can be used include an organic flame retardant and an inorganic flame retardant. Any one of the flame retardants can be used alone, or two or more types of the flame retardants can be mixed and the resultant can be used. Examples of an organic flame retardant which can be used include a halogen-based flame retardant such as a bromine-based flame retardant and a chlorine-based flame retardant; and a phosphorus-based flame retardant such as a phosphoric ester, a condensed phosphoric ester, a cyclic phosphorus compound, and red phosphorus. Examples of an inorganic flame retardant which can be used include a metal hydroxide and an antimony-based flame retardant. Further, a flame retardant is preferably an organic flame retardant, more preferably a halogen-based flame retardant. Further, a further more preferred flame retardant used is a bromine-based flame retardant. When the above-described flame retardant is used, a resin composition having good heat aging resistance can be obtained.

Examples of bromine-based flame retardants which can be used include 1,2-bis(bromophenyl)ethane, 1,2-bis(pentabromophenyl)ethane, hexabromobenzene, ethylenebis-dibromonorbornanedicarboximide, ethylenebis-tetrabromophthalimide, tetrabromobisphenol S, tris(2,3-dibromopropyl-1)isocyanurate, hexabromocyclododecane (HBCD), octabromophenyl ether, tetrabromobisphenol A (TBA), a TBA epoxy oligomer or polymer, TBA-bis(2,3-dibromopropyl ether), decabromodiphenyl oxide, polydibromophenylene oxide, bis(tribromophenoxy)ethane, ethylenebis-pentabromobenzene, dibromoethyldibrocyclohexane, dibromoneopentyl glycol, tribromophenol, tribromophenolallyl ether, tetradecabromodiphenoxybenzene, 2,2-bis(4-hydroxy-3,5-dibromophenyl)propane, 2,2-bis(4-hydroxyethoxy-3,5-dibromophenyl)propane, pentabromophenol, pentabromotoluene, pentabromodiphenyl oxide, hexabromodiphenyl ether, octabromodiphenyl ether, octabromodiphenyl oxide, dibromoneopentyl glycol tetracarbonate, bis(tribromophenyl)fumaramide, and N-methylhexabromophenylamine.

Further, as a bromine-based flame retardant, it is preferred to use 1,2-bis(pentabromophenyl)ethane. When the above-described flame retardant is used, a resin composition having good flame-resistance can be obtained.

An amount of a flame retardant included is not specifically limited, and the flame retardant is preferably contained in an amount of, for example, 8 to 50 parts by mass relative to 100 parts by mass (in total) of a non-crosslink structured resin and a thermoplastic elastomer, that is, relative to 100 parts by mass (in total) of a polymethylpentene copolymer in an amount of 30 to 60 parts by mass and the above-described thermoplastic elastomer in an amount of 40 to 70 parts by mass. When an amount of a flame retardant included is 8 parts by mass or more, a resin composition having good flame-resistance can be obtained. When an amount of a flame retardant included is 50 parts by mass or less, a resin composition having good heat aging resistance can be obtained. Further, an amount of a flame retardant included is preferably from 20 to 40 parts by mass relative to 100 parts by mass (in total) of a non-crosslink structured resin and a thermoplastic elastomer. When an amount included is within the above-described range, a resin composition having better flame-resistance and heat aging resistance can be obtained.

A flame retardant is preferably dispersed in a continuous phase 11 and a dispersed phase 12 of a resin composition 10. Thus, in a resin composition 10, it is preferred that an average distance between particles of a flame retardant is 5 µm or more. When an average distance between particles is 5 µm or more, aggregation of a flame retardant is inhibited, and thus flexibility of the coating layer 3 can be improved. A distance between particles of a flame retardant can be obtained by observing a resin composition 10 by using a scanning electron microscope (SEM).

A resin composition 10 of a coating layer 3 according to the embodiment preferably has a bending modulus of 400 MPa or less, when the resin composition contains a polymethylpentene copolymer, a thermoplastic elastomer, and a flame retardant. When a bending modulus of a resin composition is 400 MPa or less, a resin composition has excellent flexibility, and thus can be used for a coating layer of an electric cable and the like.

In a resin composition 10 of a coating layer 3 according to the embodiment, various additives can be added as far as the additives do not prevent effects of the embodiment. Examples of the additives include an antioxidant, a metal deactivator, an anti-aging agent, a lubricant, a filler (filler), a reinforcing agent, an ultraviolet absorber, a stabilizer, a plasticizer, a pigment, a dye, a colorant, an antistatic agent, a foaming agent, and a flame retardant aid.

The resin composition 10 of a coating layer 3 according to the embodiment is prepared by melt-kneading of the above-described materials, and a method used for the preparation includes a publicly-known method. For example, a resin composition 10 can be obtained by pre-blending the materials in advance using a high-speed mixing apparatus such as a Henschel mixer, and then kneading the blended materials by using a publicly-known kneader such as a Banbury mixer, a kneader, a roll mill, a single-screw extruder, and a twin-screw extruder.

A heat-resistant flexible electric cable 1 according to the embodiment includes a coating layer 3 including a resin composition 10 and an electric conductor 2 coated with the coating layer 3. As described above, a resin composition 10 according to the embodiment has excellent heat-resistance and flexibility, and thus is suitable for a coating layer 3 of a heat-resistant flexible electric cable 1.

As an electric conductor 2, a single-wire cable including one strand, or a stranded cable including twist of two or more strands can be used. The stranded cable which can be used includes any one of a concentric stranded cable which has one or several strands at the center of the cable and strands twisted around the center strands concentrically; a gathered stranded cable having two or more strands twisted in one direction as a whole; and a composite stranded cable having two or more gathered stranded cables twisted concentrically.

A diameter of an electric conductor 2 and a diameter of each of the strands composing an electric conductor 2 are not specifically limited. Further, a material of an electric conductor 2 is not specifically limited, and for example, metals in general, an electroconductive fiber, and an electroconductive polymer can be used for the material. Specifically, examples of the material which can be used for an electric conductor 2 include a publicly-known electroconductive metal materials such as copper and a copper alloy, and aluminum and an aluminum alloy. Such electroconductive metal materials have good flexibility and electroconductivity, and thus are specifically preferred. Further, plating can be applied to the surface of the electric conductor 2, and for example, tin plating, silver plating, and nickel plating can be applied to the surface.

A coating layer 3 of a heat-resistant flexible electric cable 1 according to the embodiment is prepared by melt-kneading of materials of a resin composition as described above, and a method used for the preparation includes a publicly-known method. Further, a method used for coating an electric conductor 2 with a coating layer 3 includes a publicly-known method. For example, the coating layer 3 can be formed by a usual extrusion molding method. Then, examples of an extruder used in the extrusion molding method include a mono-screw extruder and a twin-screw extruder equipped with a screw, a breaker plate, a crosshead, a distributor, a nipple, and dies.

For example, a resin composition composing a coating layer 3 is melted and kneaded by a screw, and then a certain amount of the resultant is supplied to a crosshead through a breaker plate. The melted resin composition flows onto a circumference of a nipple by a distributor, and then is extruded by dies being coated onto a perimeter of an electric conductor, and thus a coating layer 3, which coats a perimeter of an electric conductor 2, can be obtained.

In a heat-resistant flexible electric cable 1 of the embodiment, a coating layer can be formed by extrusion molding similarly to a resin composition for a general electric cable. Further, with respect to a processing method of a resin composition, as a method for kneading of resin materials and a method for applying a coat to an electric cable, a most appropriate processing method can be selected according to an intended purpose, and the method is not specifically limited. Thus, various modification to the processing method can be made without departing from the spirit of the embodiment.

As described above, a heat-resistant flexible electric cable 1 according to the embodiment includes a coating layer 3 having a phase-separated structure including a continuous phase 11 formed with a non-crosslink structured resin having a melting point of 200° C. or more, and a dispersed phase 12 formed with a thermoplastic elastomer having a melting point of less than 200° C. Further, the heat-resistant flexible electric cable 1 includes an electric conductor 2 coated with the coating layer 3. Further, an average aspect ratio of the dispersed phase 12 is 10 or less. In a coating layer 3 having such a phase-separated structure, heat-resistance is improved by the continuous phase 11 including a non-crosslink structured resin, and flexibility is improved by the dispersed phase 12 including a thermoplastic elastomer. Thus, a heat-resistant flexible electric cable 1 having excellent flexibility in addition to high heat-resistance can be obtained.

A wire harness according to the embodiment includes the above-described heat-resistant flexible electric cable 1. As described-above, a heat-resistant flexible electric cable 1 has an excellent heat-resistance and flexibility, and thus the heat-resistant flexible electric cable 1 can be preferably used, for example, as a wire harness of a motor vehicle. Further, since such a wire harness has excellent high-temperature melt resistance, the wire harness can be preferably used in an engine compartment of a motor vehicle.

EXAMPLES

The present invention is described in further detail herein below with reference to Example and Comparative Examples, but it should not be construed to be limited to the Examples in any way.

Preparation of specimens of Examples 1 to 5 and Comparative Examples 1 to 2

<Production of Resin Composition>

First, a resin composition of each of Examples and Comparative Examples was prepared by melt-kneading of a polymethylpentene copolymer, a thermoplastic elastomer, a flame retardant, and a flame retardant aid described below in amounts as shown in Table 1 using a twin-screw extruder.

(Polymethylpentene Copolymer)

TPX (registered trademark) MX004, manufactured by Mitsui Chemicals, Inc., bending modulus: 750 MPa TPX (registered trademark) RT18, manufactured by Mitsui Chemicals, Inc., bending modulus: 1450 MPa (Thermoplastic Elastomer)

Milastomer (registered trademark) 9020NS, a dynamic crosslinked thermoplastic elastomer (TPV) manufactured by Mitsui Chemicals, Inc., MFR: 0.02 g/10 min, durometer type A hardness: 89

Milastomer (registered trademark) 6030NS, a dynamic crosslinked thermoplastic elastomer (TPV) manufactured by Mitsui Chemicals, Inc., MFR: 0.10 g/10 min, durometer type A hardness: 50

PRIME TPO (registered trademark) R110E, an olefin-based thermoplastic elastomer (TPO) manufactured by Prime Polymer Co., Ltd., MFR: 2.19 g/10 min TAFMER (registered trademark) DF605, an olefin-based thermoplastic elastomer (TPO, ethylene-alpha-olefin copolymer) manufactured by Mitsui Chemicals, Inc., MFR: 1.46 g/10 min (Flame Retardant)

SAYTEX (registered trademark) 8010, 1,2-bis(2,3,4,5,6-pentabromophenyl)ethane manufactured by Albemarle Corporation (Flame Retardant Aid)

PATOX (registered trademark)-M: antimony trioxide manufactured by NIHON SEIKO CO., LTD.,

TABLE 1

| | | Example 1 | Example 2 | Example 3 | Example 4 | Example 5 | Comparative Example 1 | Comparative Example 2 |
|---|---|---|---|---|---|---|---|---|
| Polymethylpentene copolymer (parts by mass) | TPX MX004 | 30 | 45 | 60 | 45 | — | 45 | 45 |
| | TPX RT18 | — | — | — | — | 45 | — | — |
| Crosslinked rubber containing elastomer (parts by mass) | Milastomer 9020NS | 70 | 55 | 40 | — | 55 | — | — |
| | Milastomer 6030NS | — | — | — | 55 | — | — | — |

TABLE 1-continued

| | | Example 1 | Example 2 | Example 3 | Example 4 | Example 5 | Comparative Example 1 | Comparative Example 2 |
|---|---|---|---|---|---|---|---|---|
| Crosslinked rubber without containing elastomer (parts by mass) | PRIME TPO R110E | — | — | — | — | — | 55 | — |
| | TAFMER DF605 | — | — | — | — | — | — | 55 |
| Bromine-based flame retardant (parts by mass) | SAYTEX8010 | 30 | 30 | 30 | 30 | 30 | 30 | 30 |
| Flame retardant aid (parts by mass) | PATOX-M | 5 | 5 | 5 | 5 | 5 | 5 | 5 |
| Properties | Average aspect ratio | ○ | ○ | ○ | ○ | ○ | X | X |
| | High-temperature melt resistance | ○ | ○ | ○ | ○ | ○ | ○ | ○ |
| | Flexibility | ○ | ○ | ○ | ○ | Δ | X | X |
| | Anti-abrasive properties | ○ | ○ | ○ | ○ | ○ | ○ | ○ |
| | Oil resistance | ○ | ○ | ○ | ○ | ○ | X | X |
| | Flame-resistance | ○ | ○ | ○ | ○ | ○ | ○ | ○ |

<Production of Electric Cable>

An electric cable for testing including an electric conductor including 3 mm² copper, which is covered with a resin composition from each of Examples and Comparative Examples, was produced by extrusion molding by using an extrusion coating machine for an electric cable production under conditions of temperature at 250° C. When extrusion molding was performed, the outer diameter of an electric cable including a coating layer was regulated to be 3.25 mm.

[Evaluation]

<Average Aspect Ratio>

An average aspect ratio of a dispersed phase in each electric cable for testing from each of Examples was measured as follows. First, an electric cable for testing was embedded in resin. Then, trimming and figuring was performed by using an ultramicrotome equipped with a diamond knife, and vapor staining with a metal oxide was performed, and then an ultra-thin section was prepared. Then, a longitudinal section of the electric cable for testing was observed. An observation system used was a transmission electron microscope HT7700 manufactured by Hitachi High-Technologies Corporation, and was operated at an acceleration voltage of 100 kV.

Then, an image was magnified by 30,000 times, and then 50 dispersed phases were arbitrarily selected from the obtained images. Then, ratios between a major axis of longitudinal direction of the electric cable and a minor axis perpendicular direction to the longitudinal direction in each of the dispersed phases were obtained, and then an average value was calculated. When an average aspect ratio was 10 or less, the result was evaluated as "o", and when an average aspect ratio was more than 10, the result was evaluated as "x".

<High-Temperature Melt Resistance>

High-temperature melt resistance was evaluated as follows. First, around a mandrel having a diameter that is the same as the outer diameter of an electric cable for testing from each of Examples, an electric cable for testing was wound leaving no space, and then was heated under 200° C. circumstance for 30 minutes. Then, the electric cable for testing was unwound from the mandrel, and then was visually inspected whether the electric conductor was exposed or not. When exposure of the electric conductor was not observed after heating at 200° C., the electric cable for testing was evaluated as "o". Further, when exposure of the electric conductor was observed after heating at 200° C., the electric cable for testing was evaluated as "x".

<Flexibility>

Figure 3:
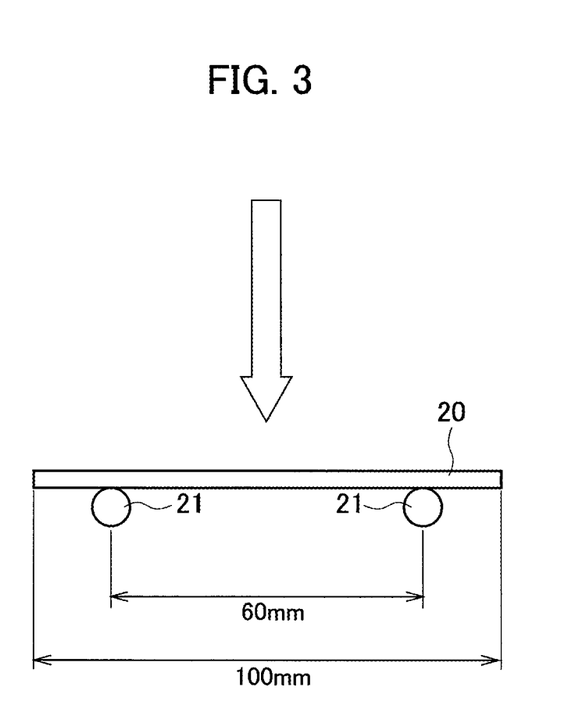
FIG. 3 is a schematic representation for describing a method for measurement of flexibility.

First, an electric cable for testing was cut into pieces having a length of 100 mm to obtain test samples. Then, as shown in FIG. 3, the test sample 20 was placed on rollers 21 arranged with a spacing of 60 mm. Then, a load was applied to the center of the test sample from the top at a speed of 100 mm/minute, and the maximum load until dropping of the electric cable was measured by using a force gage. When a value shown in the force gage was less than 7 N, the result was evaluated as "o", when a value was 7 N or more and 8.5 N or less, the result was evaluated as "Δ", and when a value was more than 8.5 N, the result was evaluated as "x".

<Anti-Abrasive Properties>

Anti-abrasive properties were evaluated by tape abrasiveness. First, a piece of 150 J garnet sandpaper on which electroconductive belts having a width of 5 mm to 10 mm were fixed perpendicular to an edge of the sandpaper at intervals of, at most, 75 mm was provided. An appropriate bracket was fixed to a pivot arm so that a test sample was placed on an unused portion of the sandpaper abrasion tape. The test sample was spread but not stretched, and thus the test sample having a length of 900 mm was placed horizontally. The abrasion tape was brought into contact with the test sample, and then a 1500 g weight was put on the abrasion tape. In this condition, the abrasion tape was moved at a speed of 1500±75 mm/minute, and then a length of an abrasion tape used until the test sample was worn out to bring the metallic electric conductor into contact with the abrasion tape was measured. Then, the test sample was moved by 50 mm, and then the test sample was turned 90° clockwise. This procedure was repeated, and the measurement was carried out 4 times in total. When a length until the contact occurred was 330 mm or more, the result was evaluated as "o", and when a length until the contact occurred was less than 330 mm, the result was evaluated as "x".

<Oil Resistance>

Oil resistance was evaluated as follows. First, a liquid in which 2,2,4-trimethylpentane and toluene were mixed at a ratio of 1:1 was provided. Then, an outer diameter of a test sample was measured, and then the test sample was immersed in the liquid at 23° C. for 20 hours. After the immersion, the test sample was recovered from the liquid, and the liquid adhering to the surface was wiped off, and then an outer diameter of the same portion as that measured before the immersion was measured. Then, a rate of change (%) from the outer diameter before the immersion in the liquid to the outer diameter after the immersion was calculated using the following equation. When a rate of change from the outer diameter before the immersion in the liquid to the outer diameter after the immersion was 15% or less, the result was evaluated as "∘", and when the rate was more than 15%, the result was evaluated as "x".

Rate of change (%)=(outer diameter after immersion−outer diameter before immersion)/(outer diameter before immersion)×100

<Flame-Resistance>

Flame-resistance was evaluated as follows. First, electric cables for testing from Examples and Comparative Examples were cut into pieces having a length of 600 mm or more to obtain test samples. Then, each of the test samples was fixed in a fume hood at an angle of 45 degrees. Then, an inner flame of a Bunsen burner was brought into contact with the test sample at a portion of 500 mm±5 mm from the upper end of the test sample for 30 seconds, and then the Bunsen burner was removed away from the test sample. When all flames of a coating layer went out within 70 seconds after the removal of the Bunsen burner from the test sample and no flame fluctuation occurred as the coating layer caught fire, the result was evaluated as "∘". On the other hand, when the test sample was burning longer than 70 seconds, the result was evaluated as "x".

[Results of Evaluations]

As shown in Table 1, an average aspect ratio of a dispersed phase of the resin composition from Example 1 to 5 is 10 or less. Thus, it is understood that the resin compositions have excellent heat-resistance (high-temperature melt resistance) and flexibility. Further, since a polymethylpentene copolymer used in Example 5 had a bending modulus of higher than 1400 MPa, the resin composition from Example 5 has slightly lower flexibility than those from other Examples.

On the other hand, since resin compositions from Comparative Examples 1 and 2 have an average aspect ratio of higher than 10, the resin compositions have lower flexibility. Furthermore, since TPO containing no crosslinked rubber component was used as a thermoplastic elastomer of resin compositions in Comparative Examples 1 and 2, the resin compositions also have lower oil resistance.

Preparation of specimens of Examples 6 to 20 and Comparative Examples 3

<Production of Resin Composition>

First, a resin composition of each of Examples and Comparative Examples was prepared by melt-kneading of a polymethylpentene copolymer, a thermoplastic elastomer, a flame retardant, and a flame retardant aid described below in amounts as shown in Table 2 to Table 4 using a twin-screw extruder.

(Polymethylpentene Copolymer)
TPX (registered trademark) MX002: manufactured by Mitsui Chemicals, Inc., bending modulus: 480 MPa
TPX (registered trademark) MX004: manufactured by Mitsui Chemicals, Inc., bending modulus: 750 MPa
TPX (registered trademark) RT18: manufactured by Mitsui Chemicals, Inc., bending modulus: 1450 MPa (Thermoplastic Elastomer)
Milastomer (registered trademark) 8030NS: a thermoplastic rubber vulcanizate (TPV) manufactured by Mitsui Chemicals, Inc., durometer type A hardness: 88
Milastomer (registered trademark) 5030NS: a thermoplastic rubber vulcanizate (TPV) manufactured by Mitsui Chemicals, Inc., durometer type A hardness: 51
Milastomer (registered trademark) 4010NS: a thermoplastic rubber vulcanizate (TPV) manufactured by Mitsui Chemicals, Inc., durometer type A hardness: 46
PRIME TPO (registered trademark) R110MP: an olefin-based thermoplastic elastomer (TPO) manufactured by Prime Polymer Co., Ltd., durometer type A hardness: 68

(Flame Retardant)
SAYTEX (registered trademark) 8010, 1,2-bis(2,3,4,5,6-pentabromophenyl)ethane manufactured by Albemarle Corporation
KISUMA (registered trademark) SAL: stearic acid-treated magnesium hydroxide manufactured by Kyowa Chemical Industry Co., Ltd.

(Flame Retardant Aid)
PATOX (registered trademark)-M: antimony trioxide manufactured by NIHON SEIKO CO., LTD.,

TABLE 2

|  |  |  | Example 6 | Example 7 | Example 8 | Example 9 | Example 10 |
|---|---|---|---|---|---|---|---|
| Polymethylpentene copolymer | | TPX MX002 | — | — | — | — | — |
| (parts by mass) | | TPX MX004 | 30 | 45 | 60 | 45 | 45 |
| | | TPX RT18 | — | — | — | — | — |
| Thermoplastic | TPV | 8030NS | — | — | — | — | — |
| elastomer | | 5030NS | 70 | 55 | 40 | 55 | 55 |
| (parts by mass) | | 4010NS | — | — | — | — | — |
| | TPO | R110MP | — | — | — | — | — |
| Flame retardant | Bromine-based flame retardant | SAYTEX8010 | 15 | 15 | 15 | 8 | 30 |
| (parts by mass) | Metal hydroxide | 5AL | — | — | — | — | — |
| Flame retardant aid (parts by mass) | | PATOX-M | 5 | 5 | 5 | 5 | 5 |
| Properties | | Bending modulus | ∘ | ∘ | ∘ | ∘ | ∘ |
| | | High-temperature melt resistance | ∘ | ∘ | ∘ | ∘ | ∘ |
| | | Flexibility | ∘ | ∘ | ∘ | ∘ | ∘ |
| | | Anti-abrasive properties | ∘ | ∘ | ∘ | ∘ | ∘ |
| | | Oil resistance | ∘ | ∘ | ∘ | ∘ | ∘ |
| | | Flame-resistance | ∘ | ∘ | ∘ | ∘ | ∘ |
| | | Heat aging resistance | ∘ | ∘ | ∘ | ∘ | ∘ |

TABLE 3

|  |  | Example 11 | Example 12 | Example 13 | Example 14 | Example 15 |
|---|---|---|---|---|---|---|
| Polymethylpentene copolymer | TPX MX002 | 45 | — | — | — | — |
| (parts by mass) | TPX MX004 | — | 45 | 25 | 45 | 45 |
| | TPX RT18 | — | — | — | — | — |

TABLE 3-continued

|  |  |  | Example 11 | Example 12 | Example 13 | Example 14 | Example 15 |
|---|---|---|---|---|---|---|---|
| Thermoplastic elastomer (parts by mass) | TPV | 8030NS | — | 55 | — | — | — |
|  |  | 5030NS | 55 | — | 75 | 55 | 55 |
|  |  | 4010NS | — | — | — | — | — |
|  | TPO | R110MP | — | — | — | — | — |
| Flame retardant (parts by mass) | Bromine-based flame retardant | SAYTEX8010 | 15 | 15 | 15 | 5 | 35 |
|  | Metal hydroxide | 5AL | — | — | — | — | — |
| Flame retardant aid (parts by mass) |  | PATOX-M | 5 | 5 | 5 | 5 | 5 |
| Properties |  | Bending modulus | ○ | ○ | ○ | ○ | ○ |
|  |  | High-temperature melt resistance | ○ | ○ | X | ○ | ○ |
|  |  | Flexibility | ○ | ○ | ○ | ○ | ○ |
|  |  | Anti-abrasive properties | ○ | ○ | ○ | ○ | ○ |
|  |  | Oil resistance | ○ | ○ | ○ | ○ | ○ |
|  |  | Flame-resistance | ○ | ○ | ○ | X | ○ |
|  |  | Heat aging resistance | ○ | ○ | ○ | ○ | X |

TABLE 4

|  |  |  | Example 16 | Example 17 | Example 18 | Example 19 | Example 20 | Comparative Example 3 |
|---|---|---|---|---|---|---|---|---|
| Polymethylpentene copolymer (parts by mass) |  | TPX MX002 | — | — | — | — | — | — |
|  |  | TPX MX004 | 45 | 45 | 45 | — | 45 | 65 |
|  |  | TPX RT18 | — | — | — | 45 | — | — |
| Thermoplastic elastomer (parts by mass) | TPV | 8030NS | — | — | — | — | — | — |
|  |  | 5030NS | — | 55 | 55 | 55 | — | 35 |
|  |  | 4010NS | — | — | — | — | 55 | — |
|  | TPO | R110MP | 55 | — | — | — | — | — |
| Flame retardant (parts by mass) | Bromine-based flame retardant | SAYTEX8010 | 15 | — | — | 15 | 15 | 15 |
|  | Metal hydroxide | 5AL | — | 30 | 60 | — | — | — |
| Flame retardant aid (parts by mass) |  | PATOX-M | 5 | 5 | 5 | 5 | 5 | 5 |
| Properties |  | Bending modulus | ○ | ○ | ○ | ○ | ○ | X |
|  |  | High-temperature melt resistance | ○ | ○ | ○ | ○ | ○ | ○ |
|  |  | Flexibility | ○ | ○ | ○ | Δ | ○ | X |
|  |  | Anti-abrasive properties | ○ | ○ | ○ | ○ | X | ○ |
|  |  | Oil resistance | X | ○ | ○ | ○ | ○ | ○ |
|  |  | Flame-resistance | ○ | X | ○ | ○ | ○ | ○ |
|  |  | Heat aging resistance | ○ | ○ | X | ○ | ○ | ○ |

<Production of Electric Cable>

An electric cable for testing covered with a resin composition from each of Examples and Comparative Examples was produced in a similar manner to Example 1.

[Evaluation]
<Bending Modulus>

A bending modulus value was obtained by preparing an injection molded piece of a resin composition having a thickness of 3.2 mm, and carrying out a measurement according to ASTM-D790 using testing speed of 1.3 mm/min and distance between fulcrums of 51 mm under atmosphere at 23° C. Then, when a bending modulus was 400 MPa or less, the result was evaluated as "o", and when a bending modulus was higher than 400 MPa, the result was evaluated as "x".

<High-Temperature Melt Resistance>

High-temperature melt resistance with respect to an electric cable for testing from each of Examples was evaluated in a similar manner to Example 1.

<Flexibility>

Flexibility with respect to an electric cable for testing from each of Examples was evaluated in a similar manner to Example 1.

<Anti-Abrasive Properties>

Anti-abrasive properties with respect to an electric cable for testing from each of Examples was evaluated in a similar manner to Example 1.

<Oil Resistance>

Oil resistance with respect to an electric cable for testing from each of Examples was evaluated in a similar manner to Example 1.

<Flame-Resistance>

Flame-resistance with respect to an electric cable for testing from each of Examples was evaluated in a similar manner to Example 1.

<Heat Aging Resistance>

For heat aging resistance, an electric cable having a length of 350 mm was heated at 180° C. for 300 hours. Then, the electric cable was recovered from the oven, and wound around a mandrel having a diameter of 1.5 times as large as an outer diameter of the electric cable. Then, when dielectric breakdown did not occur by applying voltage of 1 kV for 1 minutes, the result was evaluated as "o", and when dielectric breakdown occurred, the result was evaluate as "x".

[Results of Evaluations]

As shown in Table 2 to Table 4, since resin compositions from Examples 6 to 20 have a bending modulus of 400 MPa or less, the resin compositions have better flexibility than that from Comparative Examples 3.

As shown in Table 2 and Table 3, resin compositions from Examples 6 to 12 have a resin composition ratio between a polymethylpentene copolymer and a thermoplastic elastomer within a specific range, the resin compositions are superior in high-temperature melt resistance to that from Example 13.

As shown in Table 2 and Table 3, since resin compositions from Examples 6 to 12 contain a specific amount of flame retardant, the resin compositions are superior in flame-resistance or heat aging resistance to those from Examples 14 and 15.

As shown in Table 2 and Table 4, in resin compositions from Examples 6 to 12, a thermoplastic elastomer contains a crosslinked rubber component, and thus the resin compositions are superior in oil resistance to that from Example 16.

As shown in Table 2 and Table 4, in resin compositions from Examples 6 to 12, a bromine-based flame retardant was used instead of a metal hydroxide flame retardant used in Example 17, the resin compositions are superior in flame-resistance.

Further, as shown in Table 4, since 60 parts by mass of a metal hydroxide flame retardant is added to resin compositions of Example 18, the resin compositions are superior in flame-resistance to that of Example 17, whereas having lower heat aging resistance. From this fact, from the view point of achieving both heat-resistance and heat aging resistance, it is understood that preferably a bromine-based flame retardant is used instead of a metal hydroxide flame retardant.

As shown in Table 2 and Table 4, in resin compositions from Examples 6 to 12, since a bending modulus of a polymethylpentene copolymer is 1400 MPa or less, the resin compositions are superior in flexibility to that from Example 19.

As shown in Table 2 and Table 4, in resin compositions from Examples 6 to 12, since an instantaneous value of durometer type A hardness of a cross-linked elastomer is 50 or more, the resin compositions are superior in anti-abrasive properties to that from Example 20

While the present invention has been described above with reference to Examples, the present invention is not limited to the Examples, and various modifications can be made within the spirit of the present invention.

What is claimed is:

1. A heat-resistant flexible electric cable, comprising:
    a coating layer having a phase-separated structure including a continuous phase formed with a non-crosslink structured resin having a melting point of 200° C. or more and a dispersed phase formed with a thermoplastic elastomer having a melting point of less than 200° C., and
    an electric conductor coated with the coating layer, wherein
    an average aspect ratio of the dispersed phase is 10 or less, and
    melt flow rate of the thermoplastic elastomer is 0.5 g/10 minutes or less.

2. The heat-resistant flexible electric cable according to claim 1, wherein the non-crosslink structured resin is a polymethylpentene copolymer.

3. The heat-resistant flexible electric cable according to claim 2, wherein the coating layer contains a resin composition containing a polymethylpentene copolymer which is the non-crosslink structured resin, the thermoplastic elastomer, and a flame retardant, and having a bending modulus of 400 MPa or less.

4. The heat-resistant flexible electric cable according to claim 3, comprising 8 to 30 parts by mass of the flame retardant relative to 100 parts by mass (in total) of 30 to 60 parts by mass of the polymethylpentene copolymer and 40 to 70 parts by mass of the thermoplastic elastomer.

5. The heat-resistant flexible electric cable according to claim 3, wherein the flame retardant is a bromine-based flame retardant.

6. The heat-resistant flexible electric cable according to claim 2, wherein a bending modulus of the polymethylpentene copolymer is 1400 MPa or less.

7. The heat-resistant flexible electric cable according to claim 1, wherein a mass ratio (A/B) between the non-crosslink structured resin (A) and the thermoplastic elastomer (B) is from 30/70 to 60/40.

8. The heat-resistant flexible electric cable according to claim 1, wherein the thermoplastic elastomer comprises a crosslinked rubber component.

9. The heat-resistant flexible electric cable according to claim 1, wherein durometer type A hardness of the thermoplastic elastomer is 50 or more.

10. A wire harness, comprising the heat-resistant flexible electric cable according to claim 1.

* * * * *